(No Model.)
H. C. SPALDING.
COMPOUND ELECTRICAL CABLE.
No. 327,476. Patented Sept. 29, 1885.
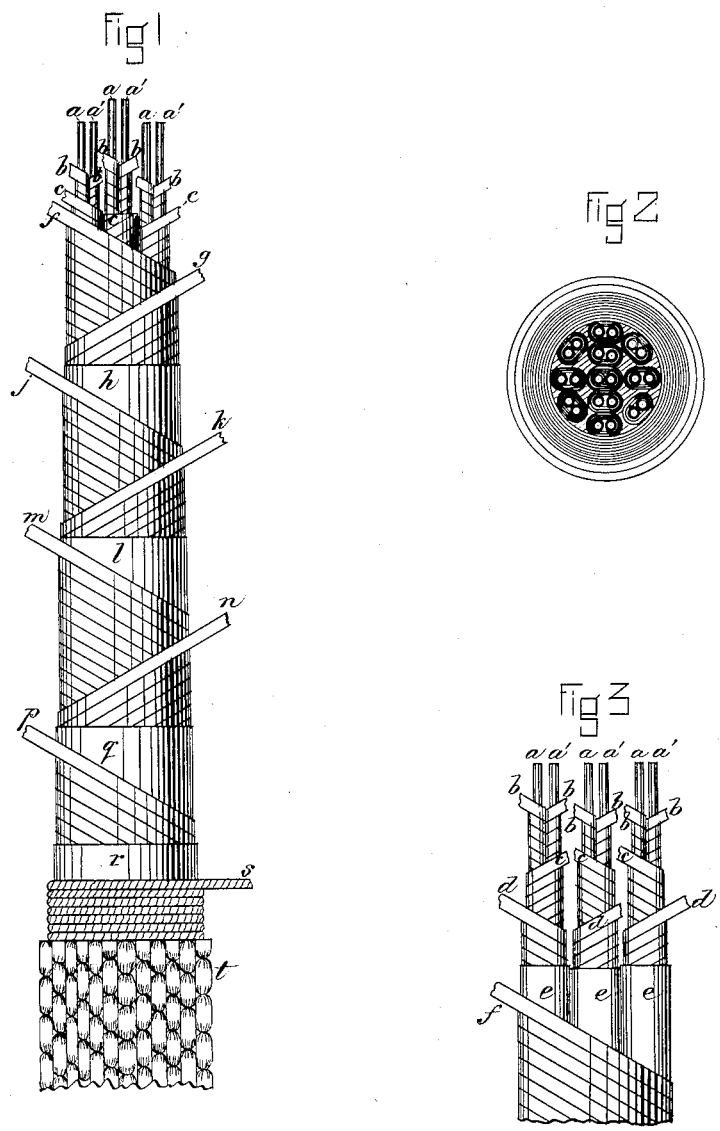
WITNESSES
W. Frisby
W. H. Doggett.
INVENTOR
Henry C. Spalding
By Parker W. Page
atty.

United States Patent Office.

HENRY C. SPALDING, OF BOSTON, MASSACHUSETTS.

COMPOUND ELECTRICAL CABLE.

SPECIFICATION forming part of Letters Patent No. 327,476, dated September 29, 1885.

Application filed March 29, 1884. Renewed February 28, 1885. (No model.)

*To all whom it may concern:*

Be it known that I, HENRY C. SPALDING, a citizen of the United States, residing at Boston, in the county of Suffolk and State of Massachusetts, have invented certain new and useful Improvements in Compound Electrical Cables, of which the following is a specification, reference being had to the drawings accompanying and forming a part of the same.

In another application filed by me I have shown and described an electrical cable in which two insulated electrical conductors, constituting a complete or round wire circuit, were inclosed in an insulated metallic sheath or screen, and the purpose and advantages of such construction are fully set forth therein. In other applications I have shown a conduit or sectional pipe inclosing a number of these cables, and containing an insulated metallic screen which surrounds the group of cables. In the latter case the cables are separated from one another by the blocks or rests by which they are supported in the conduit, the latter being permanently buried in the ground as fast as its sections are associated.

The object of my present invention is to produce a flexible compound cable—that is, a cable containing a number of circuit-wires—which embraces similar means to those employed in the rigid conduit for preventing inductive reactions and electrical retardation. To this end I bring together a desired number of pairs of insulated electrical conductors, each inclosed in an insulated metallic screen, preserving as far as possible the parallelism both of the wires of each pair and that of the several pairs. Around this assemblage of conductors as a core I then apply a flexible insulating and protective covering containing one or more insulated and flexible metal layers or sheaths.

The particular construction of this cable is illustrated in the accompanying drawings, in which Figure 1 is a view of the cable, showing the general arrangement of conductors and parts of the layers or coatings surrounding the same. Fig. 2 is a cross-section of the cable. Fig. 3 is an enlarged view showing in detail the manner in which the conductors forming the core are insulated and protected.

In order to reduce the bulk or diameter of the cable as far as practicable, and to secure great flexibility, I use a system of insulation discovered by me and made the subject of other applications for Letters Patent. I would state, however, that for the purposes of my invention other materials than those named and other methods of applying the same may be used.

The letters $a$ $a'$ designate the conductors. They are insulated by being first coated with a resinous or bituminous varnish, and then wound with a strip of fibrous material, preferably thin Manila paper, $b$. Each pair of insulated wires is then wound with a strip of metal foil—such as tin-foil—$c$, and a paper strip, $d$, is then wound upon the foil in an opposite direction. The paper strips $b$ and $d$ should be both saturated with pure paraffine before being used. Over the paper $d$ is applied a comparatively heavy coat of resinous varnish, $e$, which completes the insulation, and assists in keeping the pairs of wires in place during the subsequent stages of the construction of the cable. After a given number of the pairs of wires, prepared in the manner described, are laid together they are wound with a strip of paper, $f$. Over this and in an opposite direction is wound a sheathing or layer of tin-foil, $g$; then is applied a coating of resinous varnish, $h$, and the same operation repeated until the layers of paper $j$ $m$ $p$, the layers of metal foil $k$ $n$, and the intermediate coats of varnish, $l$ $q$, are formed.

Any good insulating-varnish that is soft when hot and slightly plastic or viscous when cold may be used in the construction of this cable. Over the outer layer, $p$, of paper is applied a thick coating, $r$, of a compound, such as a mixture of bitumen or crude turpentine boiled down until quite thick and boiled linseed-oil. I may also use to advantage for this purpose resin and boiled linseed-oil, the latter compound requiring a larger percentage of oil than the others. Into the compound while soft I wind a serving of stout twine, $S$, and I then inclose the whole in an armor or braided jacket, $t$.

I am aware that cables have heretofore been constructed in which a number of strands or pairs of insulated conductors are assembled, twisted together, and surrounded by an insulated covering, and such I do not claim.

The form of cable I have described possesses great advantages over those referred to, in that it requires less material, as I have found, to insulate the several circuits from each other when each is inclosed in the sheath of metal foil. The earth's influence in the action of the currents in the several circuits is entirely eliminated, the induction brought down to a minimum, and great flexibility secured.

Having now described the best manner of which I am aware in which my invention may be carried into effect, what I claim is—

1. In an electrical cable, the combination, with an assemblage or bundle of pairs of insulated wires, each pair forming a complete or round wire circuit and inclosed in an insulated metallic sheath, of a flexible covering surrounding said bundle and composed of two or more layers of insulating material with an intermediate layer or layers of metal, as and for the purpose specified.

2. In an electrical cable, the combination, with an assemblage or bundle of pairs of insulated wires, each pair forming a complete or round wire circuit and inclosed in an insulated metal sheath, of a flexible covering composed of two or more layers of paper with intermediate coats of varnish and an intermediate layer or layers of metal foil, substantially as and for the purpose set forth.

In testimony whereof I have hereunto set my hand this 27th day of March, 1884.

HENRY C. SPALDING.

Witnesses:
SANFORD H. DUDLEY,
E. BAKER WELCH.